United States Patent [19]
Antonevich

[11] 3,993,236
[45] Nov. 23, 1976

[54] METHODS AND APPARATUS FOR SOLDERING

[75] Inventor: John N. Antonevich, Jamestown, N.Y.

[73] Assignee: Blackstone Corporation, Jamestown, N.Y.

[22] Filed: Sept. 8, 1975

[21] Appl. No.: 611,202

[52] U.S. Cl. .............................. 228/110; 228/1 A; 228/262
[51] Int. Cl.² .................... B23K 1/06; B23K 1/08
[58] Field of Search ............. 228/1, 19, 36, 37, 40, 228/110, 111, 125, 180, 258, 259, 260, 262

[56] References Cited
UNITED STATES PATENTS

| | | |
|---|---|---|
| 2,485,444 | 10/1949 | Hofberg ............................ 228/40 X |
| 3,760,481 | 9/1973 | Greever ............................ 228/1 X |
| 3,834,015 | 9/1974 | DiRenzo ......................... 228/125 X |

*Primary Examiner*—Al Lawrence Smith
*Assistant Examiner*—Margaret Joyce
*Attorney, Agent, or Firm*—Buell, Blenko & Ziesenheim

[57] ABSTRACT

A method and apparatus for fluxless soldering, particularly of capillary joints, is provided wherein the part to be soldered is immersed in a bath of molten solder, the solder is caused to cavitate and simultaneously the part is subject to vibratory or impact energy.

10 Claims, 4 Drawing Figures

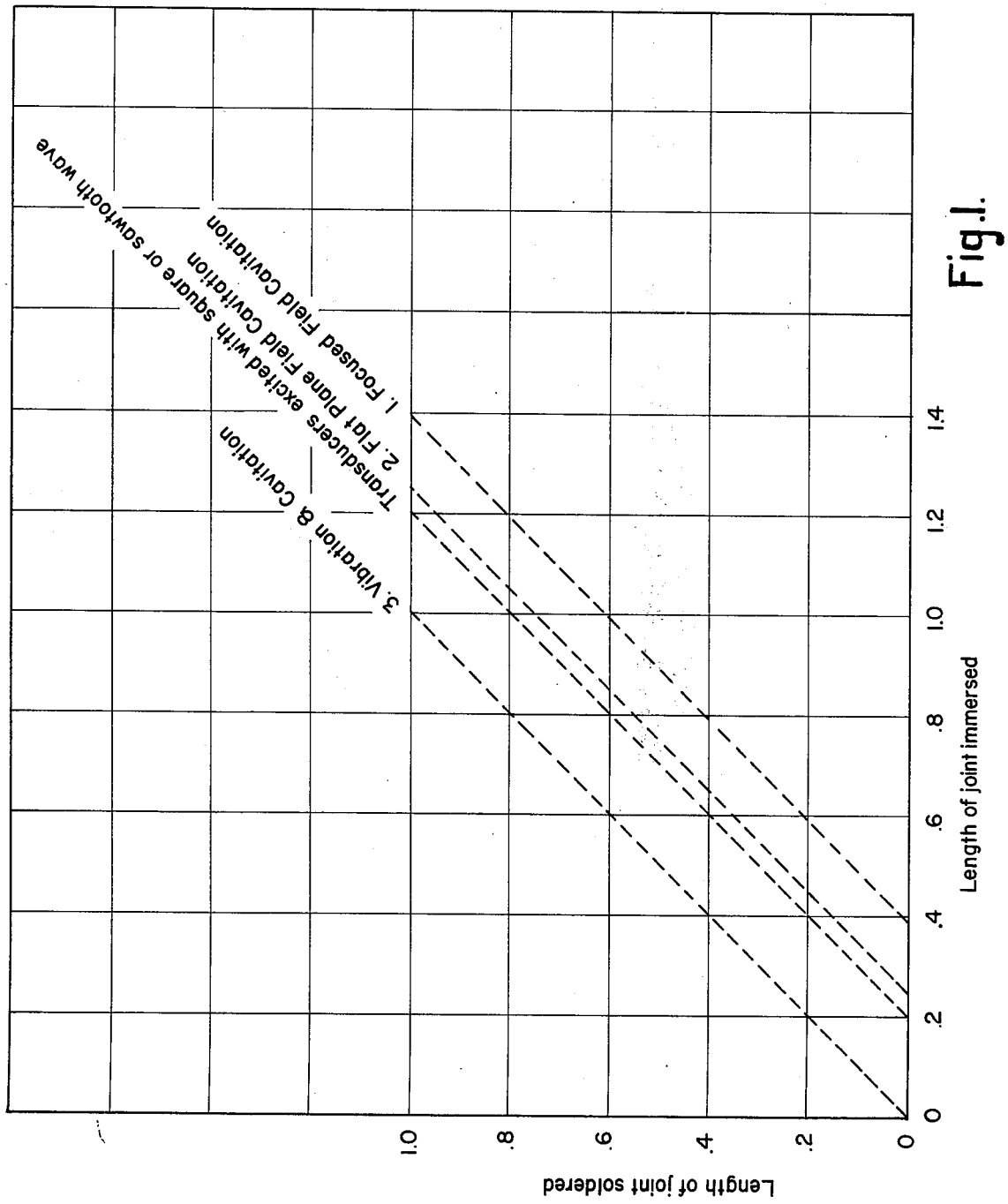

METHODS AND APPARATUS FOR SOLDERING

This invention relates to methods and apparatus for soldering and particularly to a method and apparatus for soldering capillary joints using a combination of simultaneously applied ultrasonic and vibrational energy on the workpiece.

The use of ultrasonic energy in molten solder baths to generate cavitation implosions to remove oxide layers from a surface to produce a clean surface for wetting is well known. Considerable amounts of energy are required to agitate molten metals to the threshold of cavitation. Using water as a reference, with a specific energy requirement of 1 for the onset of cavitation, it is determined that molten zinc solders have a specific energy requirement of roughly 2, molten lead 10 and tin 20. Because of the extreme energy requirements for cavitating lead and tin solders effective large ultrasonic solder baths have been difficult to develop. Generally when cavitation occurs in molten solder pots at pressure antinodes of the sound field severe attenuation and/or reflection of energy occurs due to the cavitating cloud, resulting in the collapse of the sound field and unloading, with cavitation occurring adjacent the source of ultrasonic or sonic energy input. With non-uniform cavitation distribution in the solder bath erratic soldering quality results. In the case of zinc solder where the energy requirements for cavitation are near that of water, the solder bath of zinc alloys is equivalent in design and behavior to conventional ultrasonic cleaner designs. Preheated sheets of aluminum dipped into an ultrasonic solder bath will be coated within a fraction of a second. However, aluminum capillary joints immersed in conventional solder baths of zinc solders either require meticulous degreasing, excessive preheating, or increased ultrasonic energy levels to fill and alloy with solder. Recourse to focused or high intensity low frequency ultrasonic fields has been reasonably successful in generating ample radiation pressures to force fill capillary joints and cavitation to act on the surfaces to be wetted. The use of high intensity ultrasonic fields to generate sufficient radiation pressure to force molten metal into capillary joints, usually results in excessive localized alloying or dissolution of base metal immersed into the solder, or excessive time for the solder to incrementally wet and flow into the capillary to produce a complete joint. A typical application for fluxless ultrasonic soldering is the joining of return bends to bells of aluminum air conditioning coils. The difficulty of producing a uniform high intensity sound field over a large area and particularly in a focused field results in non-uniform joining of return bend and tube arrays. As a result, soldering of large assemblies has been non-uniform and generally unsatisfactory.

This invention provides a method which reduces ultrasonic energy requirements to accomplish consistent and uniform fluxless soldering or coating of assemblies or parts with molten metals.

Another objective of this invention is to reduce or eliminate the incidence of resonant vaporous or gaseous cavities from aggregating on surfaces being soldered which cause high velocity microstreaming of solder surfaces resulting in localized pitting through rapid dissolution or errosion of the surface.

The objectives of this invention are achieved by exciting, with impacts and/or vibrations, the part or assembly of parts to be soldered or coated, while the part or assembly is immersed in a cavitating bath of molten metal. I have found that impacts or vibrations of parts in combination with ultrasonically or sonically cavitated melts has significantly reduced energy requirements for solders. Aluminum air conditioner coils, for example, using this invention can be made in about half the time conventionally used using 50 and 90 percent less power in conventional plane standing wave and focused field solder pots respectively. With this invention, copper sheets and wires can also be coated in less time and with no tendency to form unwetted areas due to attached gas bubbles.

Experimental data indicates that the contact angle between solder and a surface is modified more effectively by accelerations due to impact or moderately high amplitude vibratory movement of surfaces relative to the solder than by ultrasonic pressure variations in the solder. The changing contact angle appears to have a hysteresis effect with regard to the apparent surface tension force between the solder and the non-wetted surface it contacts tending to reduce in magnitude approaching a zero value depending upon time and amplitude of disturbance. Wetting of surfaces due to micro shock waves generated by imploding cavitation sites in combination with the gross disturbance results in a hysteresis wet and flow process in capillary type joint soldering, resulting in a very rapid approach to a condition of zero surface tension or an equilibrium tension, if energy of distrubance is lower than the surface energies interacting. Choosing the low frequency of impact or vibration to cause parts to resonate would be ideal, however, any form of vibration of parts are found adequate for complete filling of the joint.

This unique synergistic effect virtually eliminates the problems which have been commonly associated with soldering capillary joints, particularly in the aluminum field while materially reducing both the time and the energy input necessary to produce a joint.

In the foregoing general outline of my invention I have set out certain objects, purposes and advantages of my invention. Other objects, purposes and advantages of my invention will be apparent from a consideration of the following description and the accompanying drawings in which:

FIG. 1 is a graph showing the relationship between soldered length of a capillary joint and depth of joint immersion under various conditions;

Figure 4:
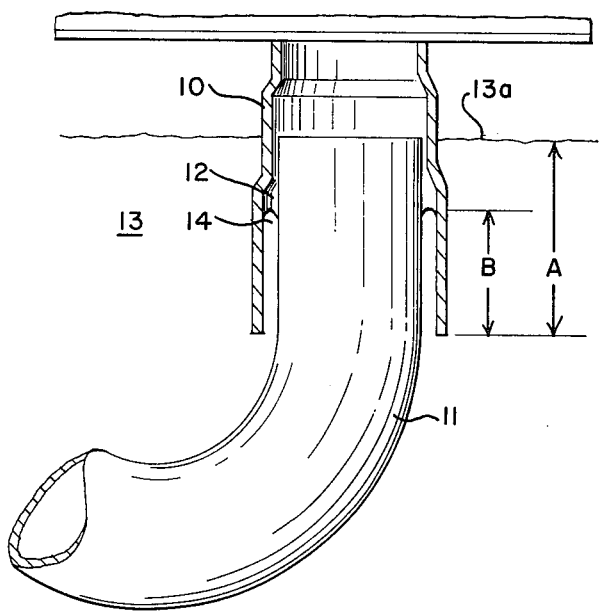
FIG. 4 is a fragmentary section of a solder joint showing the level of immersion as compared with length of joint.

Referring to the drawings I have illustrated in FIG. 4 a typical relationship of expanded tube 10 and return bend 11 which must be soldered in forming an air conditioner coil. The return bend 11 is driven into the expanded end of tube 10, leaving a capillary area 12 between them. The joint is immersed in a bath of solder 13 having a surface level 13a and the solder rises in the capillary to a certain level 14 depending upon the conditions. In this figure I have identified depth of immersion with the letter A and length of solder joint (joint penetration) with the letter B.

FIG. 1 shows the relationships obtained between joint penetration and depth of joint immersion into zn/al solder. The joints were aluminum return bends in bells of an aluminum air condition coil with a 0.035 inch gap between bend and bell. Similar results were obtained for copper capillary joints in lead tin solder.

In FIG. 1, Curve 1 shows the relationship between alloyed or soldered length of a capillary joint and depth of joint immersion into solder ultrasonically activated in a focused ultrasonic field; Curve 2 is obtained for joints made in a plane standing wave ultrasonic field; Curve 3 is the limit obtained when vibrations are coupled to the joint while immersed in an ultrasonically activated solder bath according to this invention. The curves show that for a given condition of vibratory energy input the distance between the free solder level and solder alloy line in the capillary is constant and equal to the intercept of the curve with the immersion depth axis. Controlling the amplitude of vibratory or impact forces coupled to capillary joints effectively controls the depth to which solder flows and alloys in a given joint when immersed in a cavitating bath of molten solder. It is found that vibratory or impact forces coupled to immersed joints prior to and not during the onset of cavitation will not contribute appreciably to the production of quality capillary joints or improve the solder coating of parts.

I have also found that, if vibratory or impact forces are applied while the part is withdrawn from the solder bath, icicles or tear drop formations of solder can be controlled or eliminated. These ligament forms result from the high surface tension of the solder and the cooling of the solder on withdrawal. The introduction of vibrations or impacts during withdrawal tends to level the ligament forms.

Figure 2:
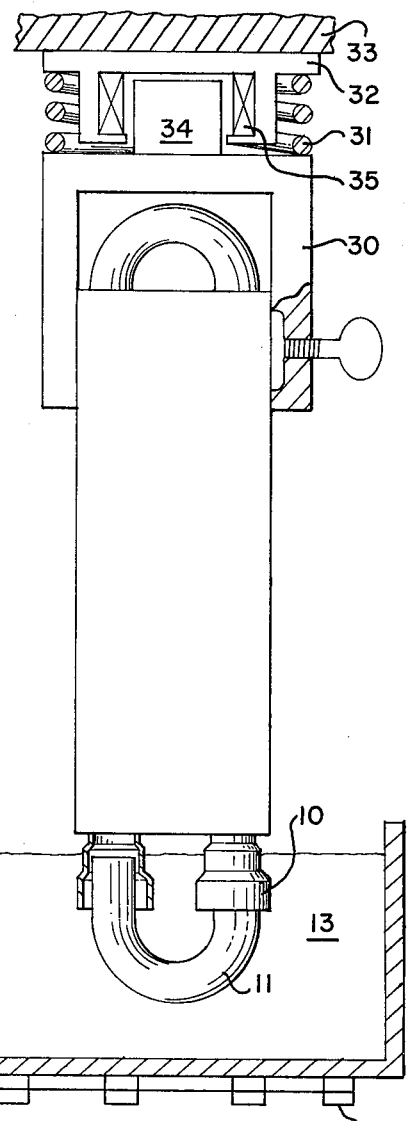
FIG. 2 is a sectional view of an apparatus for carrying out the method of this invention.

In FIG. 2, I have illustrated an apparatus for practicing this invention on tube and fin air conditioner coils 15 having expanded tube ends 10 as illustrated in FIG. 4 into which return bends 11 are inserted and the tube ends 10 and bends 11 are immersed in a bath of solder 13 below the solder level 13a. The solder 13 is contained in a heated solder pot 20 which maintains the solder at the desired temperature level. Solder pot 20 is equipped with ultrasonic generators 21 on the bottom powered by a source 22. The generators 21 are designed to cavitate the bath 13. An overhead clamp 30 carries coil 15 for immersion in bath 13. Clamp 30 is mounted on carrier spring 31 suspended from stator 32 on carrier frame 33. An armature 34 is fixed on clamp 30 with coil 35 carried by stator 32. When coil 35 is energized armature 34 and clamp 30 are caused to vibrate. In operation, the tube end 10 and return bend 11 are mechanically driven together, the coil is fixed in clamp 30 and end 10 and return bend 11 are immersed in bath 13 and heated to the solder temperature. The ultrasonic generators 21 and coil 35 are simultaneously energized so as to cause solder bath 13 to cavitate and the coil to be vibrated.

Figure 3:
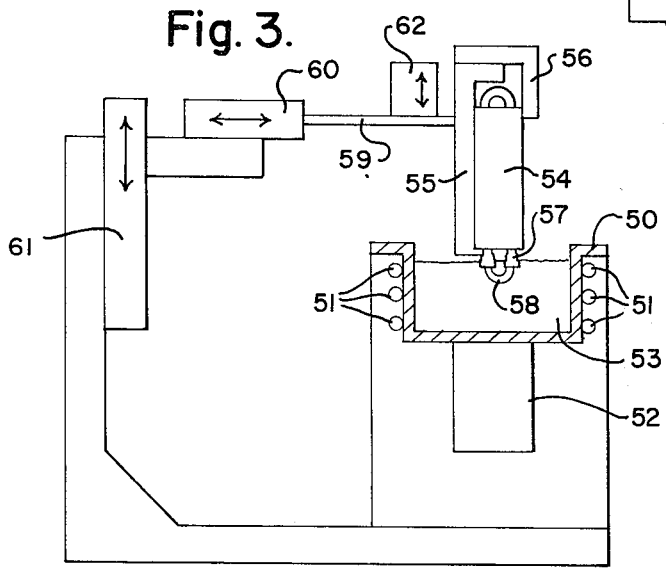
FIG. 3 is a second embodiment of apparatus for practicing this invention.

In the apparatus shown in FIG. 3 I have illustrated another embodiment of apparatus for carrying out this invention. In this apparatus I provide a solder pot 50 surrounded by heaters 51 and provided with transducers 52 on the bottom designed to cavitate molten solder 53 in pot 50. An air conditioner coil 54 is held on support frame 55 by clamp 56 with the expanded tube ends 57 and return bend 58 beneath the surface of the molten solder. The support frame 55 is mounted on a cantilever arm 59 provided with horizontal drive means 60 and vertical drive means 61. A vibrating or impacting means 62 is provided on cantilever arm 59 to cause the support frame 55 to vibrate vertically.

In operation the tube end 57 and return bend 58 are driven together, the coil 54 is mounted on support 55 by clamp 56, the vertical 61 and horizontal 60 drive means are energized to move the coil 54 over solder pot 50 and lower it until the tube ends 57 and return bend 58 are immersed in molten solder 53 and held there until they reach the temperature of the solder. The transducers 52 are energized along with vibrator 62 when the tube end and return bend reach temperature to move solder into the capillary area between the tube end and return bend and then the support is raised to remove them from the bath.

In broad terms the process of fluxless soldering according to this invention consists simply in dipping the part into molten solder for a given time period required to raise the immersed portion of the part to the temperature of the solder or a temperature at which solder and the surface would normally interact. At this temperature the solder is made to cavitate by sonic or ultrasonic pressure variations in the solder and the part is vibrated or impacted repeatedly. After a period of time, energy to cavitate is stopped and the part withdrawn preferably with vibrations or impacts continued until the solder ligament formed on withdrawal is leveled.

While I have illustrated and described certain presently preferred embodiments and practices of my invention in the foregoing specification, it will be understood that this invention may be otherwise embodied within the scope of the following claims.

I claim:

1. A method of soldering capillary joints comprising the steps of immersing the part to be soldered in a molten bath of solder, causing the solder bath to cavitate and simultaneously subjecting the part to one of vibratory and impact energy separate from the solder bath cavitation whereby the solder moves uniformly into the capillary joints.

2. A method of soldering capillary joints as claimed in claim 1 wherein the solder bath is subject to ultrasonic energy to cause it to cavitate.

3. The method of soldering capillary joints as claimed in claim 1 wherein the part is subject to vibration.

4. The method as claimed in claim 1 wherein the part is subject to impacts.

5. The method of soldering capillary joints as claimed in claim 1 wherein the part is removed from the molten solder while subjecting it to continuing impact and vibratory energy.

6. The method of fluxless soldering comprising the steps of immersing surfaces of the part to be soldered in a molten bath of solder, causing the solder bath to cavitate and simultaneously subjecting the part to one of vibratory and impact energy separate from the solder bath cavitation whereby the immersed surfaces are uniformly coated with solder.

7. An apparatus for soldering comprising in combination a solder pot, a bath of molten solder in said pot, means for maintaining said bath of solder molten, means acting on said solder pot to cause the molten solder to cavitate, support means adjacent said pot adapted to hold a part to be soldered immersed to a desired level in said molten solder with the surfaces to be soldered immersed, and means adjacent the pot acting on said part during its immersion in the solder simultaneously with the cavitation of the solder and imparting one of vibratory and impact energy into said part while said part is immersed in the molten bath and while the bath is simultaneously caused to cavitate, whereby the immersed surface is uniformly coated with solder.

8. An apparatus as claimed in claim 7 wherein the means causing the molten solder to cavitate is at least one transducer on the center line of the pot.

9. An apparatus as claimed in claim 7 wherein said support means includes vertical vibratory means for vibrating said part.

10. An apparatus as claimed in claim 7 wherein the support means includes an cantilever arm adapted to hold the part above the solder pot, means for moving said arm horizontally of said pot, means for moving said arm vertically with respect to the pot and vibratory means acting on said arm to impart vertical vibratory motion to said part.

* * * * *